United States Patent [19]

Harris

[11] 4,420,392

[45] Dec. 13, 1983

[54] FUEL-WATER SEPARATOR WITH FLOW-REDUCTION FEATURE

[75] Inventor: Robert S. Harris, Connersville, Ind.

[73] Assignee: Stant Inc., Connersville, Ind.

[21] Appl. No.: 354,813

[22] Filed: Mar. 4, 1982

Related U.S. Application Data

[63] Continuation-in-part of Ser. No. 241,076, Mar. 6, 1981, Pat. No. 4,384,962.

[51] Int. Cl.³ .............................................. B01D 21/26
[52] U.S. Cl. .................................... 210/86; 210/114; 210/115; 210/416.4
[58] Field of Search ............... 210/104, 114, 115, 119, 210/123, 136, 416.4, 86, 512.1

[56] References Cited

U.S. PATENT DOCUMENTS

| | | | |
|---|---|---|---|
| 2,170,247 | 8/1939 | Lambert | 210/166 |
| 3,012,675 | 12/1961 | Phelps et al. | 210/86 |
| 3,187,895 | 6/1965 | Pall et al. | 210/114 |
| 3,273,716 | 9/1966 | Kennepohl | 210/120 |
| 3,385,440 | 5/1968 | Ray | 210/123 |
| 3,731,802 | 5/1973 | James | 210/804 |
| 3,931,011 | 1/1976 | Richards et al. | 210/136 |
| 3,996,136 | 12/1976 | Jakubek et al. | 210/804 |
| 4,010,101 | 3/1977 | Davey | 210/86 |
| 4,017,397 | 4/1977 | Copeland | 210/238 |
| 4,053,405 | 10/1977 | DeKeyser et al. | 210/119 |
| 4,082,669 | 4/1978 | Bainbridge | 210/187 |
| 4,278,550 | 7/1981 | Watts | 210/788 |
| 4,364,825 | 12/1982 | Connor | 210/416.4 |

Primary Examiner—Ivars C. Cintins
Attorney, Agent, or Firm—Barnes & Thornburg

[57] ABSTRACT

In a fuel-water separator including entry and exit ports for fuel connectable in a fuel line supplying an engine and fuel flow paths between the ports for separating water from the fuel, the improvement comprises first and second passages leading to the exit port and a float valve ball for closing the first passage in response to the accumulation of a predetermined level of separated water. The second passage has a cross-sectional dimension which is substantially smaller than the first so that only restricted operation of the engine is permitted by virtue of a reduced fuel flow rate through the second passage when the first passage is closed.

10 Claims, 4 Drawing Figures

FUEL-WATER SEPARATOR WITH FLOW-REDUCTION FEATURE

This is a continuation-in-part of my co-pending application Ser. No. 241,076, filed Mar. 6, 1981, now U.S. Pat. No. 4,384,962.

The present invention relates to fuel-water separators for use in diesel engine applications to separate water from diesel fuel. More particularly, the present invention relates to separators which include a fuel flow control valve responsive to the level of accumulated liquid contaminants, including water, in the separator.

It is well known that diesel fuel often contains rather substantial amounts of liquid contaminants, particularly water, which, if not removed, will damage the fuel injection system of diesel engines. Many fuel-water separators and filters have been suggested in the prior art, some of which have included buoyantly operated valves for sensing the level of liquid contaminants, including water, which have been separated from the fuel and accumulated in the fuel-water separator. Examples of such separators are to be found in U.S. Pat. Nos. 4,017,397; 3,931,011; 3,273,716; 3,187,895; and 2,170,247. Other fuel-water separators and filters in the prior art have incorporated devices for electrically indicating the level of contaminants, including water, separated and accumulated by the separators and filters. Examples of such devices are to be found in U.S. Pat. Nos. 4,010,101 and 3,012,675.

Despite the presence of buoyantly operated valves for automatically draining contaminants from fuel-water separators and the presence of electrical indicating means for indicating critical levels of contaminants within fuel-water separators, the failure or malfunction of such features is not unknown, whereupon water which has been separated from the fuel and accumulated by the separator is allowed to pass from the separator to the engine, resulting in serious engine damage. It is therefore an object of the present invention to incorporate within a fuel-water separator a control means for preventing serious engine damage in the event that the fuel-water separator becomes substantially filled with water despite the presence of signalling or valving means normally operable in response to such condition.

The present invention constitutes an improvement over prior art fuel-water separators and the preferred embodiment herein illustrated constitutes an improvement over the separator disclosed in my earlier commonly assigned application Ser. No. 241,076, filed Mar. 6, 1981. A fuel-water separator according to the present invention includes a container having entry and exit ports for fuel and water-separation means in the container between the entry and exit ports for separating water from the fuel. Typically, there is included means for draining the separated water from the container and means for indicating when water is to be drained. In accordance with the present invention, the fuel-water separator also includes means for at least partially closing the exit port in response to a predetermined level of separated water in the container to reduce fuel flow through the exit port to a predetermined level whereby the reduction in fuel flow provides an indication that the separated water needs to be drained. Preferably, the predetermined level of reduced fuel flow is such that the diesel engine is incapable of operation above an idle level. This feature has the advantage of permitting the restricted engine operation at a speed sufficient to maintain engine-operated safety equipment such as power steering, power brakes, and the like, yet will deter any long-term operation of the engine which might cause engine damage.

In accordance with the present invention, a fuel-water separator can include signal means for sensing a predetermined level of separated water in the container. The sensing means in turn can actuate an appropriate indicator visually perceivable to the engine operator which indicates the existence of an undesirably high level of separated water in the fuel-water separator. Further, there is provided a pair of passages leading to the outlet of the fuel-water separator, one of which is much smaller than the other, the smaller passage being of such a size as to reduce fuel flow to permit only restricted operation of the engine. There is further provided valve means actuable for closing the larger of the passages leading to the outlet, the valve means being actuable by a water level in the fuel-water separator in excess of that necessary to actuate the sensing means. This feature has the advantage of first indicating to the engine operator that certain remedial action is desirable. Thereafter, if normal engine operation is continued for any substantial period of time, thereby permitting further accumulation of water, the valve means is actuated to close a first passage leading to the fuel outlet of the separator. The valve means leaves open a second smaller passage leading to the fuel outlet to reduce fuel flow and to permit only restricted operation of said engine.

A fuel-water separator according to the present invention can incorporate various other features to advantageously separate and settle water from fuel in accordance with my earlier application Ser. No. 241,076, filed Mar. 6, 1981 and in accordance with the prior art. Various other features and advantages of the present invention will become apparent in view of the following detailed description of the embodiment illustrated in the accompanying drawings which exemplify the best mode of carrying out the invention as presently perceived. In such drawings.

Figure 1:
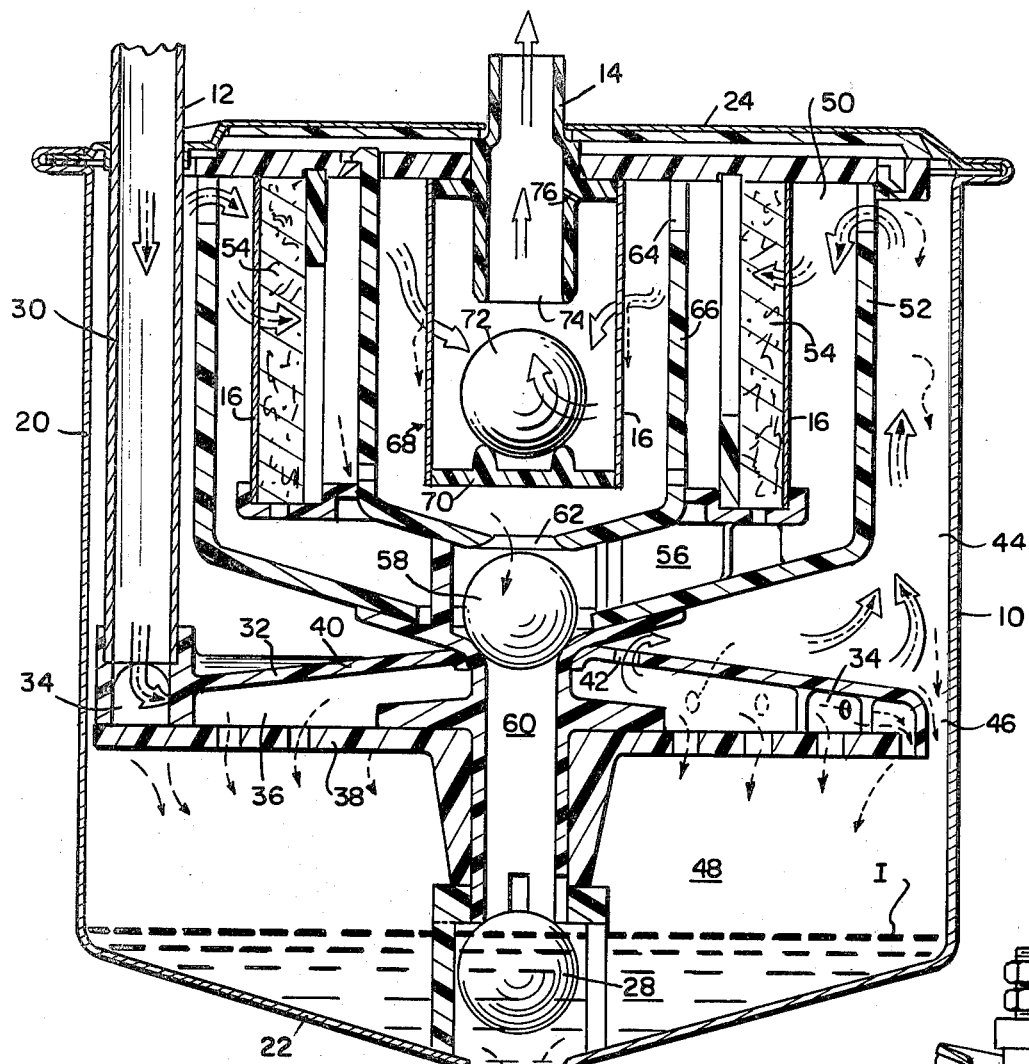
FIG. 1 is a full sectional view of a separator embodying the features of the present invention taken generally along the axis of the container.

The fuel-water separator shown in FIGS. 1-4 includes a container 10, an entry port 12 to the container 10, and an exit port 14 from the container 10. A plurality of means 16 are provided in the container 10 between the entry port 12 and the exit port 14 for separating water from fuel passing through the separator. A drain 18 is provided for draining the separated water from the fuel-water separator. The container 10 is shown to comprise a cylindrical housing 20 having an integral conical bottom 22 with the drain 18 situated at the central lowest portion of the sloped bottom 22. A closure 24 is fixed to the top of the cylindrical housing 20 to completely seal the container 10 except for the entry port 12, exit port 14, and drain 18.

The drain 18 is shown to include a threaded petcock 26 which, by opening and closing, can control the drainage of water from container 10. A buoyant ball 28 is provided having a specific gravity such that it floats on water but does not float on fuel. The fuel-water interface is indicated in the FIGS. by line I. Upon opening petcock 26, the water is permitted to drain only down to a predetermined level at which time ball 28 will descend and close drain opening 18 whereupon petcock 26 can be closed.

Entry port 12 includes a tube 30 descending into a lower portion of the separator to a first water-separation means 32. The first water-separation means 32 comprises an arcuate passageway 34 designed to apply a centrifugal force to the fuel-water mixture passing therethrough. The passageway 34 opens into chamber 36 defined by a lower porous plate 38 and an upper member 40. The first water separation means 32 is intended to centrifugally act on the fuel-water mixture, thereby forcing the higher density water to the outer wall so that the water is separated from the fuel and drains downwardly, while the lighter density fuel concentrates at the upper member 40 passing through opening 42.

The fuel, now with a reduced amount of water present, passes upward into chamber 44, the size of which is much larger than chamber 36. Because of the larger size of the chamber, the apparent rate of flow of fuel through chamber 44 is much slower, thus permitting water to settle from the fuel-water mixture by gravity, the water precipating through aperture 46 to the water-collecting chamber 48. The fuel, with yet an additional amount of water removed, passes from chamber 44 into an inner chamber 50 within an outer cup 52. Within outer cup 52 there is provided a sleeve 54 of untreated fiberglass or other appropriate media through which the fuel is caused to pass. A surface tension separator 16 is provided around the outer periphery of the sleeve 54 to separate fine water particles from the fuel. The fine water particles are caused to descend through conical chamber 56, passing by buoyant ball 58 into drainage tube 60, leading to the water-collection chamber 48. Ball 58 has a buoyancy characteristic similar to that of ball 28, thereby permitting the downward passage of water from chamber 56 to drain tube 60, but preventing the downward passage of fuel. Likewise, should the level of the water within container 10 be high enough, ball 58 rises to close opening 62 to prevent water from moving upward through opening 62.

After the fuel has passed through the surface tension separator 16 and the fiberglass media 54, it proceeds through opening 64 in inner cup 66 to the final separation means 68 which comprises a second surface tension separator 16. The tension separators 16 are preferably cylindrical elements of monofilament polyester fiber, monofilament TEFLON, or other similarly effective materials. The tension separators 16 operate by surface tension to separate any remaining water from the fuel which has proceeded through the various stages of the fuel-water separator.

Figure 3:
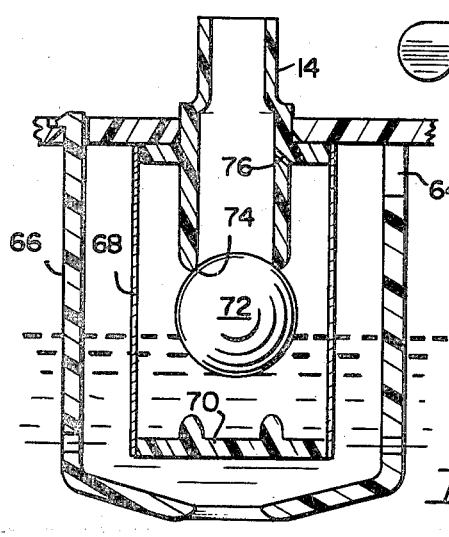
FIG. 3 is a sectional view of a portion of the separator of FIG. 1 showing the fuel flow reduction control valve in a closed condition due to the high level of water accumulated in the separator.

A lower end 70 of the cylindrical separation means 68 is closed by a closure holding a buoyant ball 72. Above the buoyant ball 72 there is provided a pair of passages 74 and 76 leading to exit port 14. Passage 76 is of a much smaller diameter than passage 74. Ball 72 has a buoyancy characteristic similar to that of balls 28 and 58, thereby normally permitting fuel to pass through the larger passage 74, but preventing fuel flow through passage 74 when the level of water within the fuel flow through inner cup 66 rises to a predetermined level covering approximately one-half (½) of surface area of the separator 16. At such predetermined level, water begins to penetrate the separator 16 and settle to the bottom 70, thereby causing the ball 72 to rise. This relationship is shown in FIG. 3. Upon the upward motion, the buoyant ball 72 seats against passage 74, thereby closing passage 74 and leaving only passage 76 leading to exit port 14.

Figure 2:
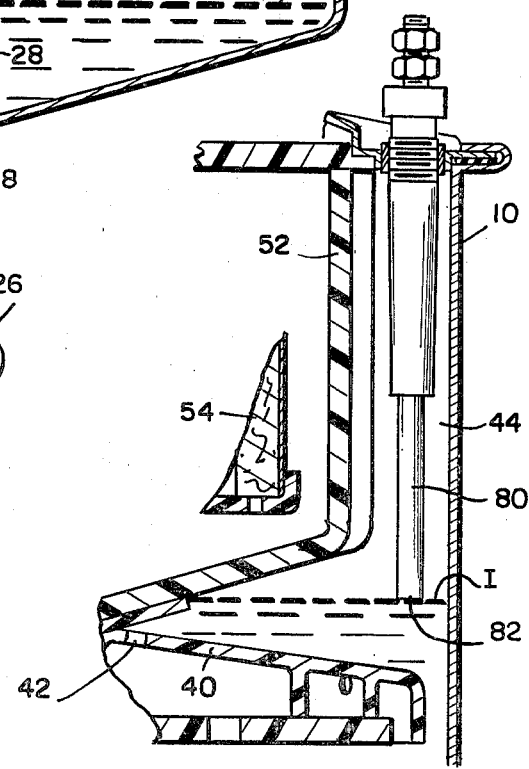
FIG. 2 is a sectional view of a portion of the separator of FIG. 1 embodying a water level sensing probe.

As shown in FIG. 2, there is provided a water level sensor probe 80. The probe 80 may be any of a number of commercially available liquid level probes adapted to either capacitive or resistive circuitry to sense the level of the water within container 10. The liquid level probe 80 may conventionally be hooked to an indicator light on the dashboard of a vehicle or to a solenoid valve which would replace petcock 26. In the event that probe 80 was connected to an indicator light, the presence of water at the predetermined level indicated in FIG. 2 would normally cause the light to become illuminated, warning the operator of the fact that the container 10 needs to be drained.

In the event of an electrical failure, however, the operator would not receive any signal or indication from the liquid level probe 80 of the water level. With continued operation, the level of water within the fuel-water separator would continue to rise within the container 10 until it reaches a second higher predetermined level, as shown in FIG. 3 whereupon buoyant ball 72 would seat against the opening of passage 74, thereby closing the opening. Fuel would then pass only through the much smaller opening 76. Preferably, the size of opening 76 would be gauged so that the fuel would flow at a rate sufficient only to allow restricted operation of the engine supplied by the fuel. The significantly reduced level of engine operation would then indicate to the engine operator that immediate remedial action was required in order to prevent damage to the engine. In a vehicle, for instance, the reduced flow rate might be reduced to a predetermined minimum level required to operate the engine at a speed sufficient to operate engine-operated safety equipment such as power steering, power brakes, etc. In other instances, the reduced flow rate might permit the vehicle to move at slow speed to a maintenance area.

Figure 4:
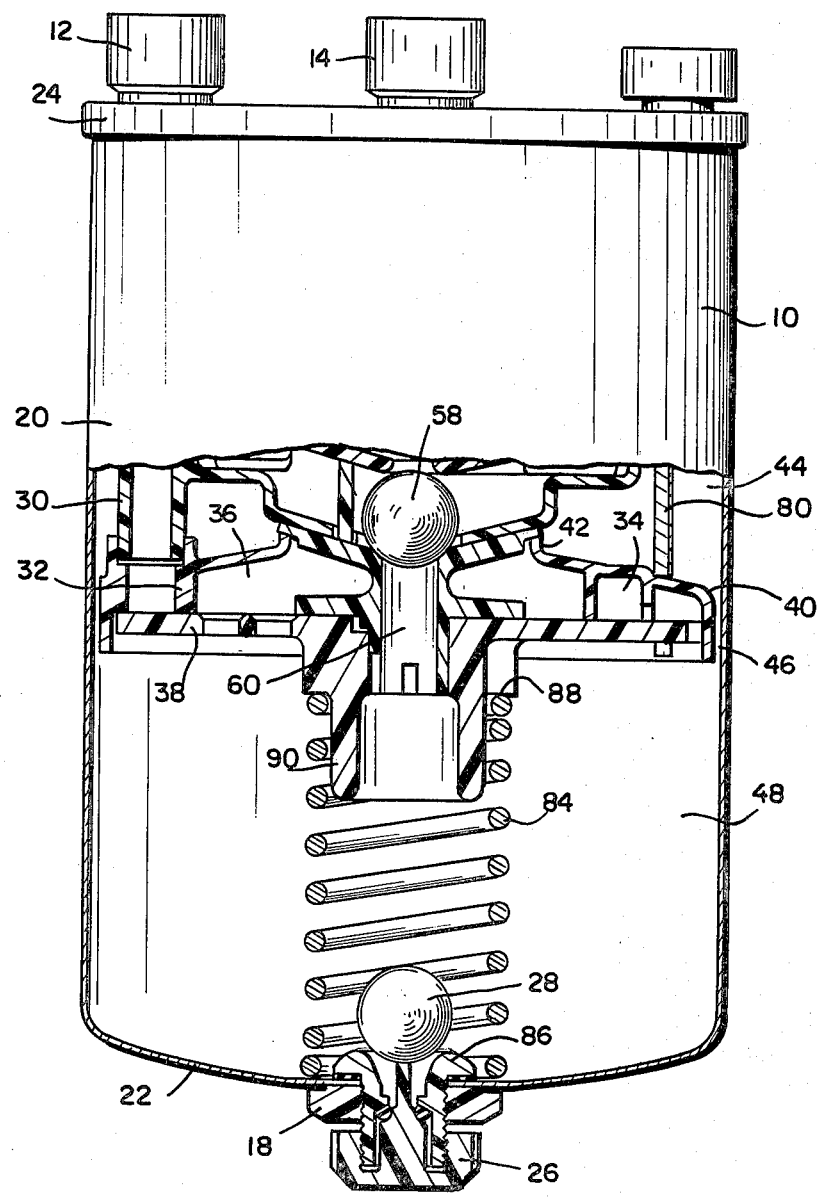
FIG. 4 is an elevation view partially in section of an alternative embodiment of the invention.

As shown in FIG. 4, the size of the water-collecting chamber 48 can be increased in size by providing a longer container side wall 20 and means 84 for maintaining the various water-separation means 32, 68, etc., in an upper portion of the container 10. As illustrated, the means 84 comprises a spring which also performs the function of retaining ball 28 within operable range of the seat 86 of drain 18. The spring 84 contacts the inside surface of sloped bottom 22 and ridge 88 on a downward axial projection 90 of porous plate 38, thereby defining a cylindrical cage within which ball 28 is free to vertically move with the interface between the fuel and separated water.

While the invention has been described with reference to the presently preferred and illustrated embodiment thereof, it is not intended that the invention be unduly limited by this description of the preferred embodiment, and instead, it is intended that the invention be defined by the means and their obvious equivalents set forth in the following claims.

What is claimed is:

1. A fuel-water separator comprising a container, an inlet to and an outlet from the container, the inlet and outlet being connectable in a fuel line supplying an engine, a pair of passages leading to the outlet, a first of which is much larger than the second, means inside said container defining a progression of spaces through which the fuel moves from the inlet to the outlet, said space-defining means being disposed in said container to direct the fuel through a series of downwardly and upwardly directed paths as it moves through said spaces to cause the higher density water to move downwardly while the lower density fuel moves upwardly, said space-defining means further defining openings in the lower portions of said spaces through which the separated water drains downwardly, first valve means for closing at least one of said openings to control the fuel and water movement, and second valve means actuable by a predetermined amount of water in the container for closing said larger passage whereby only restricted operation of said engine is permitted by virtue of the fuel flow rate through said smaller passage.

2. The invention of claim 1 in which said first valve means includes a first float valve ball having a density less than water and greater than the fuel such that the first ball will move upwardly to release the water and move downwardly to stop fuel flow through the one opening.

3. The invention of claim 2 wherein the second valve means includes a second float valve ball having a density less than water and greater than the fuel such that the second ball will move upwardly in response to the predetermined amount of water to close the larger passage and move downwardly to open the larger passage when the water is below the predetermined amount.

4. The invention of claim 3 in which said container is provided at its lower portion with a drain opening and third valve means for closing said opening, said third valve means including a petcock operable when actuated to drain separated water and a third valve ball for stopping fuel flow through the drain opening, said third valve ball having a density less than water and greater than the fuel to move downwardly to close said drain opening when the separated water has been drained.

5. The invention of claim 4 including means defining a circular path through which the fuel moves after entering said entry port, said path-defining means including a radially outer wall against which the water is centrifugally forced, said wall having openings through which the separated water moves.

6. The invention of claim 5 including means providing a media in one of said spaces having a downwardly directed surface upon which the water coalesces to move downwardly and through which the fuel moves to progress to the next space.

7. The invention of claim 5 including means providing a media in one of said spaces having a surface tension-discriminating surface through which the fuel will move and down which the separated water will move.

8. The invention of claim 4 wherein the third valve ball is retained in operable position by a spring means extending between the drain opening and said space-defining means, the spring means biasing the space-defining means toward an upper portion of said container.

9. The invention of claim 1 further comprising signal means for sensing a predetermined amount of separated water in the container.

10. The invention of claim 1 in which said first valve means includes a first float valve ball having a density less than water and greater than the fuel so as to move upwardly as separated water is collected to close the one opening in the lower portion of said spaces.

* * * * *